US008437462B2

(12) United States Patent
Saravanan et al.

(10) Patent No.: US 8,437,462 B2
(45) Date of Patent: May 7, 2013

(54) SYNCHRONIZATION OF MULTIPLE TARGET SYSTEM DATA

(75) Inventors: Senthilvel Saravanan, Milpitas, IL (US); Rajiv Kambli, Cupertino, CA (US); Peter Koenig, Downers Grove, IL (US)

(73) Assignee: Aspect Software, Inc., Chelmsford, MA (US)

( * ) Notice: Subject to any disclaimer, the term of this patent is extended or adjusted under 35 U.S.C. 154(b) by 1094 days.

(21) Appl. No.: 12/264,395

(22) Filed: Nov. 4, 2008

(65) Prior Publication Data

US 2010/0111284 A1 May 6, 2010

(51) Int. Cl.
*H04M 7/00* (2006.01)
*H04M 3/00* (2006.01)
*H04M 5/00* (2006.01)

(52) U.S. Cl.
USPC ........... 379/229; 379/219; 379/264; 379/268; 379/269; 379/265.02

(58) Field of Classification Search .................. 379/229, 379/265.02, 265.11, 265.09, 219, 268, 242, 379/269, 264
See application file for complete search history.

(56) References Cited

U.S. PATENT DOCUMENTS

| | | | |
|---|---|---|---|
| 2007/0036331 A1* | 2/2007 | Fitzgerald | 379/265.02 |
| 2009/0274290 A1* | 11/2009 | Owens et al. | 379/265.09 |
| 2009/0316879 A1* | 12/2009 | Kuns et al. | 379/265.09 |
| 2010/0008492 A1* | 1/2010 | Kuns et al. | 379/265.11 |

* cited by examiner

*Primary Examiner* — Thjuan K Addy
(74) *Attorney, Agent, or Firm* — Husch Blackwell LLP

(57) ABSTRACT

A method and apparatus are provided for exchanging configuration information within a call center system between a central server and a plurality of dissimilar contact centers. The method includes the steps of the central server monitoring an contact center of the plurality of dissimilar contact centers for a configuration change message and converting the configuration change between a format of the central server and a format of a subscribing contact center of the plurality of contact centers, where the subscribing contact center is different than the monitored contact center.

22 Claims, 1 Drawing Sheet

SYNCHRONIZATION OF MULTIPLE TARGET SYSTEM DATA

FIELD OF THE INVENTION

The field of the invention relates to communication systems and, more particularly, to automatic contact distributors.

BACKGROUND OF THE INVENTION

Call centers are generally known. Call centers are typically used wherever an organization has occasion to handle a multitude of individual contacts with clients. Usually, the organization will hire a number of agents to interact with clients.

Contacts between the organization and clients may be handled under any of a number of different communication mediums. For example, contacts may be initiated through the public switch telephone network (PSTN) by a client calling a telephone number of the organization. Alternatively, the organization may place telephone calls to its clients. In either case, connection of the telephone call with an agent may be handled by an automatic call distributor (ACD).

Similarly, contacts with clients through the Internet may be handled by a host of a contact center. Contacts in this case may be handled under a voice format (e.g., VoIP) or under a text format (e.g., e-mail, chat, etc.).

Once a call is detected, the ACD may select an agent to handle the call. The agent may be selected based upon qualifications in handling the type of call involved, based upon experience with the client involved or based upon idle time. Once an agent is selected, the ACD may automatically route the call to a telephone of the selected agent.

In order to serve large markets, ACDs are often used as networked systems with locations in many different areas. In many cases, the ACDs of the networked system may have been manufactured by different providers and operate under different formats. Because of the importance of networked ACDs, a need exists for better methods of exchanging information among ACDs in networked systems.

SUMMARY

A method and apparatus are provided for exchanging configuration information within a call center system between a central server and a plurality of dissimilar contact centers. The method includes the steps of the central server monitoring an contact center of the plurality of dissimilar contact centers for a configuration change message and converting the configuration change between a format of the central server and a format of a subscribing contact center of the plurality of contact centers, where the subscribing contact center is different than the monitored contact center.

DETAILED DESCRIPTION OF AN ILLUSTRATED EMBODIMENT

While call centers work well, they are constantly evolving and, in some cases, require replacement or expansion. When a call center made by a first call center provider must be replaced or expanded, the organization will often consider and may, in fact, purchase a call center from a competitor for use with existing, legacy call centers because of a lower price.

However, call center products from competitors often do not work well together because of differing operating philosophies, hardware and software. Because of the importance of call centers, a need exists for better methods of coordinating the operation of call center products provided by competitors.

Figure 1:
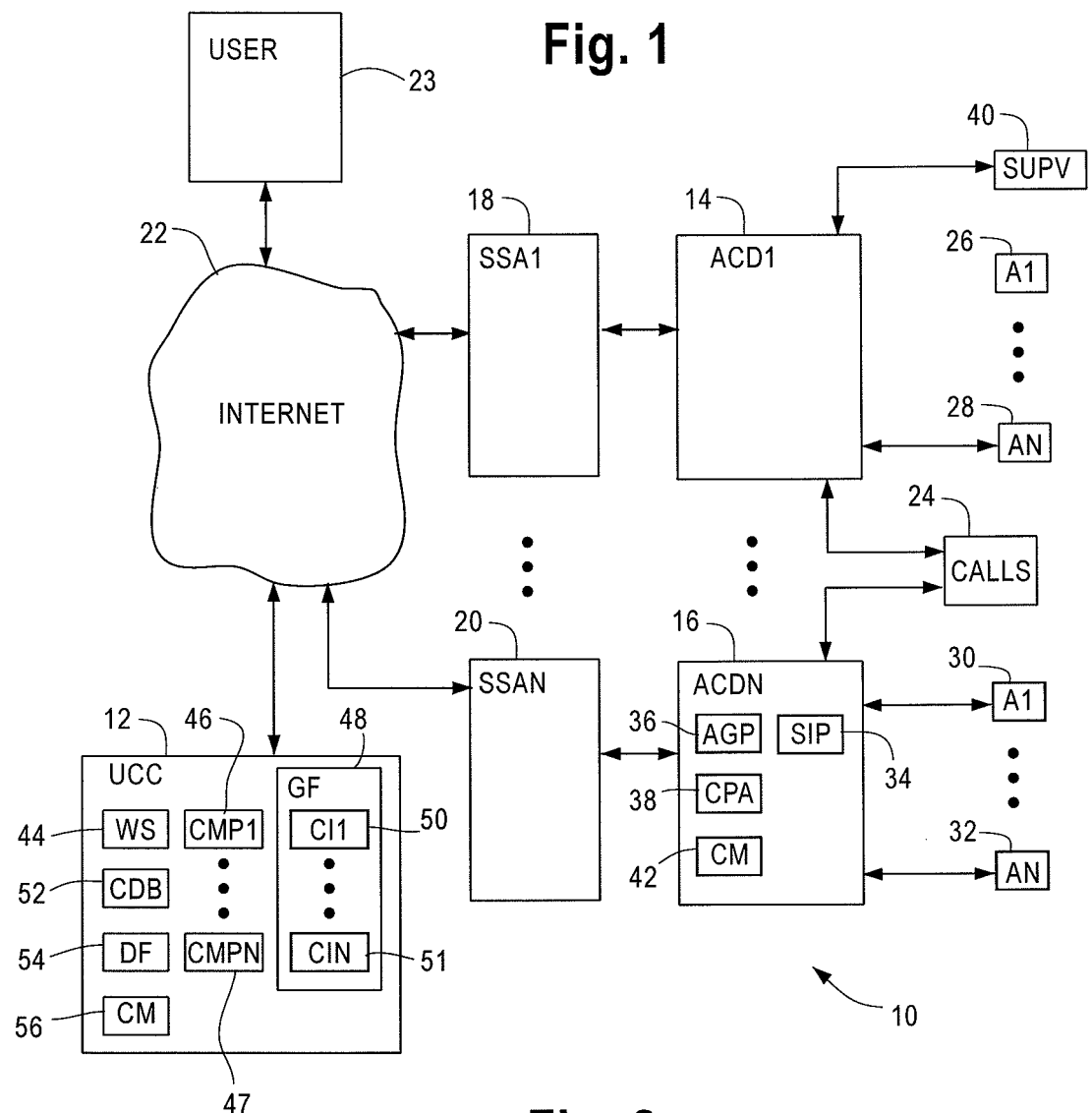
FIG. 1 is a block diagram of an automatic contact distribution system in accordance with the invention.

FIG. 1 is a block diagram of a call center system 10 shown generally in accordance with an illustrated embodiment of the invention. Included within the contact center system 10 is a unified command and control server (UCC server) 12 for administering operation of a number of dissimilar contact centers 14, 16 of the contact center system 10. While FIG. 1 shows only two contact centers 14, 16, it should be understood that the contact center system of FIG. 1 may include any number of contact centers 14, 16. Moreover, the term "dissimilar contact centers" should be understood to mean contact centers that do not share the same command and control structure. For example, a First Point Spectrum ACD call center made during the late 1990s does not use the same command and control structure as an Aspect ACD made during the same time period.

The individual contact centers 14, 16 may process contacts 24 with clients (not shown) under any of a number of different formats. For example, the contacts 24 may arrive as calls placed through the PSTN or Internet (not shown). The contact center 14, 16 may determine a purpose of the contact via the identity of the client and/or an intended destination of the contact.

For example, the system 10 could be used by an organization that sells software. In such a case, the organization could use the system 10 to route calls from clients who need help in the use of the software to software experts. In support of this effort, the organization may reserve a number of telephone numbers and/or Internet addresses where each number or address is reserved for a specific software product.

In order to support customer service, the organization may provide a respective agent terminal 26, 28, 30, 32 for each software expert. The organization may also classify each software expert (hereinafter sometimes referred to as "agents" 26, 28, 30, 32) as to their skills in handling each type of software product.

Figure 2:
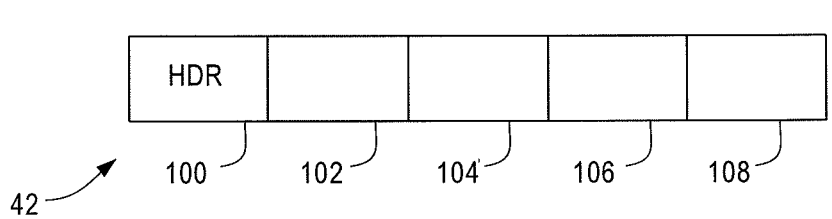
FIG. 2 is a configuration message that may be used by an contact center of FIG. 1.

As each software expert signs into or signs out of a contact center 14, 16 through an agent station 26, 28, 30, 32, a sign-in processor 34 accepts a sign-in identifier provided by the expert 26, 28, 30, 32 and composes a configuration message 42 such as that shown in FIG. 2. The configuration message may include a header 100 that identifies the message 42 as a configuration message. The message 42 may also include a first information field 102 that identifies the message 42 as being a sign-in or sign-off message. A third field 104 may contain data such as an agent identifier. Other data fields 106, 108 may be provided that provide agent information (e.g., skill set, assigned agent group, etc.).

The sign-in processor 34 may broadcast the configuration message 42 to one or more contact center applications (e.g., workforce management application, call center management application, quality management application, directory access protocol application, reporting database application, etc.) 38 within the contact center 14, 16. If the configuration message 42 is a sign-in message, then the contact center applications may respond by adding the agent to one or more agent groups and begin assigning contacts 24 to the agent.

In general, the contact centers 14, 16 of the system 10 may classify contacts 24 by an inferred purpose of the call determined from the number dialed or Internet address to which the contact 24 is directed. Once the purpose of the contact is determined, an agent selection application of the contact management applications 18 of the contact center 14, 16 may select an agent 26, 28, 30, 32 by matching the skills of the agents with the purpose of the contact 24.

In order to more efficiently route calls, the agents 26, 28, 30, 32 may be grouped by skill into one or more agent groups. Calls may then be queued to a group and connected to the first available agent.

In order to maintain efficient operation of the contact center 14, 16, a local supervisor 40 may access the contact center 14, 16 and make configuration changes as appropriate. For example, the supervisor 40 may add new agents or transfer agents among agent groups. In this case, a supervisor working through a supervisor station 40 may access an agent group processor 36 and enter a group identifier. Upon entering the identifier, the supervisor may identify an agent to add and activate an add function to add an agent 26, 28, 30, 32 to an agent group. Alternatively, the supervisor 40 may select an agent within a group, select another agent group and activate a transfer function. In response, the agent group processor 36 may compose a configuration message 42 that may again be broadcast to other contact center applications 38 within the contact center 14, 16.

The supervisor 40 may also make configuration changes to call routing applications as appropriate for call campaigns or changes in operating conditions. For example, the supervisor 40 may set up additional contact routing scripts for promotional activities or to reduce loading on certain agent groups. In this case, the supervisor 40 may create the script or select an existing script for modification. Modifications may include the entry of agent groups and an identifier of a contact type or classification that is to be handled by the new script. Upon activation of the new script a script control application within the call management application may generate a configuration change message 42 that registers the new script with the other the other call center applications 38.

Under the embodiment illustrated in FIG. 1, the UCC server 12 may be coupled to the contact centers 14, 16 through a respective sub-system adapter 18, 20. One or more administrative persons (users) working through a terminal (the person and terminal together hereinafter referred to as an "admin user") 23 may access a website 44 of the server 12 through the Internet 22. In general, the operation of the contact centers 14, 16 may be controlled through the activities of an administrative user 23 and through use of the server 12. While the admin user 23 is shown connected to the server 12 through the Internet 22, the admin user 23 could also be connected to the server 12 through an intranet or may be co-located and be directly connected to the server 12.

While the contact centers 14, 16 may be different in structure and operation, the use of the sub-system adapters 18, 20 allows the system of FIG. 1 to be operated as if it were one large call center. Moreover, the server 12 may have a completely different control structure than any of the contact centers 14, 16 where there is very little in common among the contact centers 14, 16. This allows the server 12 to operate under a "best of breed" philosophy where the sub-system adapters 18, 20 accommodate any differences.

The architecture of the UCC server 12 is simple, scalable, and extensible. In simple conceptual terms, the server 12 sits on top of existing administrative interface applications and databases of the contact centers 14, 16. "Sitting on top of" means that the administrative interfaces and databases of the contact centers 14, 16 do not rely upon the server 12 for proper operation. The server 12 uses the interfaces of the contact centers 14, 16 to read data from their databases and to write changes into them, but it does not attempt to replace the functionality of the call centers 14, 16. Instead, the server 12 acts as a web wrapper, providing a unified view of administrative data, but not requiring any changes to the existing contact centers 14, 16. As much as possible, the server 12 simply acts as another client to the current administrative interfaces of the contact centers 14, 16, which allows existing administrative tools to continue working independently, particularly in the case where the connection of the contact centers 14, 16 with the server 12 is lost.

Located within each of the server 12 may be one or more configuration message processor 46, 47 that monitor the contact centers 14, 16 for configuration messages 42 from a particular contact center application 38. The sub-system adapters 18, 20 are constructed to route configuration messages 42 to a configuration processor 46, 47 based upon the type of configuration message involved. For example, configuration messages from a workforce management application of call centers 14, 16 may be routed to a first configuration processor 46, while configuration messages from a call management application may be routed to a second configuration processor 47, and so on.

When a configuration processor 46, 47 detects a configuration message 42, the configuration processor 46 saves the configuration message in the configuration message database 52. The configuration processor 46, 47 may also retrieve a destination file 54 that identifies applications 38 within each of the call centers 14, 16 that have registered to receive the particular type of configuration message 42 involved.

It should be noted in this regard that each application 38 of any call center 14, 16 may register (subscribe) to receive any of a number of configuration messages 42 from any other call center 14, 16. For example, the call management applications of each call center 14, 16 may specifically register to receive agent group messages (e.g., agent additions, deletions, etc.) from any other call center 14, 16. Alternatively, the call management applications of each call center 14, 16 may register to receive status information regarding call queues, (e.g., time in queue, agent availability, etc.).

In general, configuration messages are broadcast by each contact center 14, 16, through the sub-system adapter 18, 20, to the appropriate configuration processor 46, 47. The configuration processor 46, 47 saves the configuration message 42 within the database 42 and then converts the configuration messages 42 to the format used by the subscribing contact center 14, 16.

Reformatting and saving configuration messages within the configuration message database 52 allows a set of system applications within the UCC server 12 to track a current state of each of the contact centers 14, 16. The further reformatting and sending of configuration messages to subscribing contact centers 14, 16 allows the other contact centers 14, 16 to determine a status of other contact center 14, 16 and to forward contacts when a contact center 14, 16 is overloaded or otherwise cannot accept additional contacts.

The configuration message processor 46 may detect configuration messages 42 by analyzing each message 42 received from the contact center 14, 16. The configuration message processor 46 may detect configuration messages 42 by comparing the header (or some other portion) 100 of each received message with a known set of headers or other bit sequence associated with configuration messages.

Figure 3:
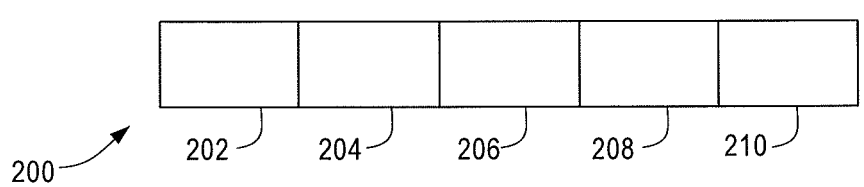
FIG. 3 is a configuration message that may be used by the server of FIG. 1.

Upon detecting a configuration message 42, the configuration message processor 46, 47 reformats the message 42 into an equivalent message 200 such as that shown in FIG. 3 under a format used by the subscribing contact center 14, 16. In order to reformat the message 42, the configuration processor 46, 47 may first determine the type of message involved by retrieving the first field 102 and comparing the content of the first field with a list of known message types.

Upon determining the type of message involved, the configuration processor 46, 47 may retrieve a configuration file 48 that defines one or more sets of processing sequences (e.g., subroutines) 50, 51 for converting between the format used by the UCC server 12 to the format used by the subscribing contact center 14, 16. For example, the contact center 14, 16 may use a header 202 that is the same or different than the header 100 used by the UCC server 12. For example, a first set of instructions 50, 51 may be used to address the message 200 for delivery to the subscribing contact center 14, 16.

Rather than using an identifier in the third field 104 (e.g., an agent identifier in the case of a sign-in message), the subscribing contact center 14, 16 may include a name of the agent in the third field 206 with an alpha-numeric agent identifier in the fourth field 208. Moreover, the format of the agent identifier may be different between the message 42 from the UCC server 12 and a properly formatted message 200 of the subscribing contact center 14, 16. For example, the agent identifier in the third field 104 may be encoded using a first number of bits while the agent identifier in the fourth field 208 may use a second number of bits that is different than the first number of bits. In this case, a second set of instructions 50, 51 may be used to map the agent identifier between corresponding fields 104, 208 of the messages 42, 200 and also to reformat the number of bits appropriately.

In the case where the format used by the subscribing contact center 14, 16 contains additional information (e.g., an agent name in the case of a sign-in message), then the configuration processor 46, 47 may add default information to the message 200 retrieved from other sources. For example, in the case of a sign-in message, the configuration processor 46, 47 may use the agent identifier along with a fourth set of instructions 50, 51 to retrieve an agent name from a configuration file 48. Alternatively, the configuration processor 46, 47 and fourth set of instructions 50, 51 may send a query to the source contact center 14, 16 requesting a name associated with the agent identifier. In either case, the configuration processor 46, 47 may then enter the default information into the configuration message 200 sent to the subscribing contact center 14, 16.

In each case, the configuration file 48 may be used by the configuration processor 46, 47 to reformat configuration messages from the server 12 to the subscribing contact centers 14, 16. In some cases, information may be mapped from a first location in a configuration message to a different location in the configuration message 200 processed by the subscribing contact center 14, 16. In other cases, the information within the information fields may simply be reformatted to conform with the requirements of the subscribing contact center 14, 16.

Once a configuration message 42 has been converted, the converted message 200 may be sent to the subscribing contact center 14, 16. Once sent, the information from the configuration message 200 may be used by any of a number of other applications within subscribing contact center 14, 16.

For example, a workforce management application within the subscribing contact center 14, 16 may track a contact loading of each of the source contact centers 14, 16. The administrative user 23 may also access the workforce management application within each of the contact centers 14, 16 and track loading in real time.

If the administrative user 23 should determine that one particular agent group is overloaded, then the user 23 may access a configuration management application 56 within the UCC 12 and add or transfer agents among work groups to reduce the overload. As changes are made, those changes are added to the database 52. Once the changes are added to the database 52, the management application 56 or database 52 generates a configuration change message 42.

In this case, the configuration processor 46 detects the configuration change message 42 from the either the application 56 or database 52 and converts the configuration message 42 to a format used by the contact centers 14, 16. As above, the configuration processor 46 detects the configuration change message 42 via the header 100. Upon detecting the configuration message, the configuration process may retrieve a message type from the second field 102. From the message type, the configuration processor 46 may again retrieve a conversion file that defines a set of steps for converting the configuration message from the application 56 or database 52 into a format recognizable by the contact center 14, 16 using the process substantially as described above.

By converting configuration messages between the format used by the UCC server 12 and respective formats of the contact centers 14, 16, the UCC server 12 is able to maintain an accurate database of the configuration of each of the contact centers 14, 16. By maintaining an accurate database 52, the administrative user 23 is able to control the operation of the contact centers 14, 16 in such a way that a loss of connection between the UCC server 12 and contact centers 14, 16 does not effect operation of the contact centers 14, 16.

In another alternative, the administrative user 23 may retrieve and review contact routing information of the contact centers 14, 16. For example, contact classification parameters based upon destination telephone number or e-mail addresses may be reviewed and changed by the user 23 as necessary to ensure the smooth flow of contacts among contact centers 14, 16. Similarly, destination agent groups for classified contacts or required skill sets may be modified as appropriate. In each case, changes to the configuration database 52 would cause the generation of a configuration change message 42 that would be converted to an equivalent message 200 that is propagated to the contact centers 14, 16 to implement changes made by the user 23.

A specific embodiment of a method and apparatus for exchanging configuration information within a contact center system has been described for the purpose of illustrating the manner in which the invention is made and used. It should be understood that the implementation of other variations and modifications of the invention and its various aspects will be apparent to one skilled in the art, and that the invention is not limited by the specific embodiments described. Therefore, it is contemplated to cover the present invention and any and all modifications, variations, or equivalents that fall within the true spirit and scope of the basic underlying principles disclosed and claimed herein.

The invention claimed is:

1. A method of exchanging configuration information within a call center system between a central server and a plurality of dissimilar contact centers, such method comprising;

the central server monitoring the plurality of dissimilar contact centers for a configuration change message routed from a contact center of the plurality of dissimilar contact centers to a selected one of a plurality of configuration processors of the central server based upon a determined configuration change message type of the configuration change message; and converting the configuration change message to a format of a subscribing contact center of the plurality of contact centers, where the subscribing contact center is different than the contact center from which the configuration change message was routed.

2. The method of exchanging information as in claim 1 further comprising the subscribing contact center receiving a configuration change from the central server and saving the configuration change message in the contact center and the configuration processor identifying any application within each of the dissimilar contact centers that have registered to receive the determined message type.

3. The method of exchanging information as in claim 1 further comprising detecting the configuration change from a content of a header of a message received from the contact center.

4. The method of exchanging information as in claim 3 further comprising determining the message type of the configuration message from a type field of the message.

5. The method of exchanging information as in claim 4 further comprising retrieving a configuration file defining a first set of information fields for the determined type of message processed by the contact center and a second set of information fields for a message processed by the subscribing contact center where the first and second sets of fields have different formats.

6. The method of exchanging information as in claim 5 further comprising mapping information between at least some non-coincident fields of the message of the contact center and message of the central server.

7. The method of exchanging information as in claim 6 further comprising reformatting at least some information transferred between the fields of the message of the contact center and the corresponding fields of the message of the central server.

8. The method of exchanging information as in claim 7 further comprising adding default information to at least some fields of the reformatted message in a case where the message does not contain corresponding information.

9. Apparatus for exchanging configuration information within an automatic contact distribution system between a central server and a plurality of dissimilar contact centers, such apparatus comprising;
    means within the central server for monitoring the plurality of dissimilar contact centers for a configuration change message routed from a contact center of the plurality of dissimilar contact centers to a selected one of a plurality of configuration processors of the central server based upon on a determined configuration message type; and
    means for saving the configuration change message in a message database of the central server and for converting the configuration change message to a message format of a subscribing contact center of the plurality of contact centers.

10. The apparatus for exchanging information as in claim 9 further comprising means within the subscribing contact center for receiving a configuration change message from the central server and saving the configuration change in the contact center.

11. The apparatus for exchanging information as in claim 9 further comprising means for detecting the configuration change from a content of a header of a message received from the contact center.

12. The apparatus for exchanging information as in claim 11 further comprising means for determining a type of the configuration message from a type field of the message.

13. The apparatus for exchanging information as in claim 12 further comprising means for retrieving a configuration file defining a first set of information fields for the determined type of message of the contact, center and a second set of information fields for a corresponding message of the central server where the first and second sets of fields have different formats.

14. The apparatus for exchanging information as in claim 13 further comprising means for mapping information between at least some non-coincident fields of the message of the contact center and message of the central server.

15. The apparatus for exchanging information as in claim 14 further comprising means for reformatting at least some information transferred between the fields of the message of the contact center and the corresponding fields of the message of the central server.

16. The apparatus for exchanging information as in claim 15 further comprising means for adding default information to at least some fields of the message between the server and contact center in a case where the message does not contain corresponding information.

17. Apparatus for exchanging configuration information within a contact center system between a central server and a plurality of dissimilar contact centers, such apparatus comprising;
    a configuration change message received at the central server from a monitored contact center of the plurality of contact centers routed from a contact center of the plurality of dissimilar contact centers to a selected one of a plurality of configuration processors of the central server based upon on a determined configuration change message type of the configuration change message; and
    a configuration processor that saves the configuration change message in a message database of the central server and that converts the configuration change message between a format of the central server and format of a subscribing contact center of the plurality of contact centers.

18. The apparatus for exchanging information as in claim 17 further comprising a terminal adaptor that reformats the configuration change message from a format of the monitored contact center and the central server.

19. The apparatus for exchanging information as in claim 17 wherein the configuration message further comprises a type field that defines a type of configuration message.

20. The apparatus for exchanging information as in claim 19 further comprising a configuration file defining a first set of information fields for the determined type of message processed by the contact center and a second set of information fields for the message processed by the central server where the first and second sets of fields have different formats.

21. The apparatus for exchanging information as in claim 20 wherein the configuration file further comprises a first set of instructions for mapping information between corresponding fields of the configuration message between the contact center and the central server.

22. The apparatus for exchanging information as in claim 20 wherein the configuration file further comprises a first set of instructions for reformatting information between corresponding fields of the configuration message between the contact center and the central server.

* * * * *